(Model.)

W. F. GEISSLER.
CALF WEANER.

No. 278,532. Patented May 29, 1883.

WITNESSES:
Chas. Nida
C. Sedgwick

INVENTOR:
W. F. Geissler
BY Munn & Co
ATTORNEYS.

UNITED STATES PATENT OFFICE.

WILLIAM F. GEISSLER, OF COMFORT, TEXAS.

CALF-WEANER.

SPECIFICATION forming part of Letters Patent No. 278,532, dated May 29, 1883.

Application filed January 10, 1883. (Model.)

*To all whom it may concern:*

Be it known that I, WILLIAM F. GEISSLER, of Comfort, in the county of Kendall and State of Texas, have invented a new and Improved Calf-Weaner, of which the following is a full, clear, and exact description.

Reference is to be had to the accompanying drawings, forming part of this specification, in which similar letters of reference indicate corresponding parts in both the figures.

Figure 1:
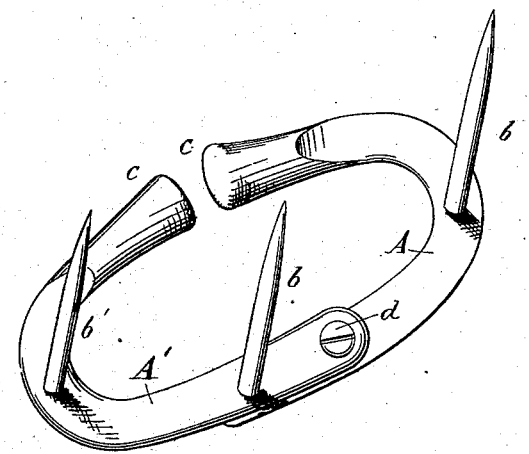
Figure 2:
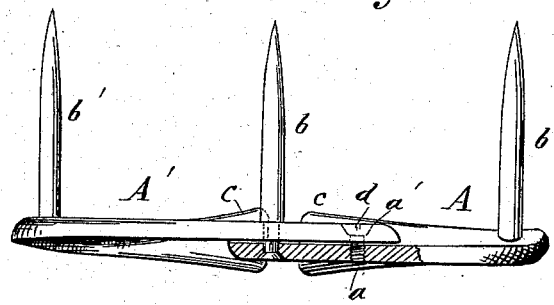

Figure 1 is a perspective view of my new and improved calf-weaner, and Fig. 2 is a broken front elevation of the same.

This invention relates to that class of calf-weaners that are adapted to be attached to the central cartilage of the calf's nose, like a bull-ring, the parts of the weaner being provided with sharp points that come against the cow's bag when the calf attempts to suck; and the invention consists in attaching the parts or sections of the device together by a pivot forming a part of one of the points and adapting them to be held closed by means of a small screw, whereby the device is rendered very cheap, yet effective and reliable.

A A′ represent the parts or sections of the device. These parts are semi-elliptical in form, and are substantial duplicates of each other, except that the flat end of the part A is formed with the screw-threaded opening $a$, while the part A′ is formed with the plain countersunk corresponding opening, $a'$. The free ends of the sections A A′ are enlarged, as shown at $c$ $c$, so as not to injure the nose of the calf, and the joined ends are made flat, as shown clearly in Fig. 1, and are joined together by means of the lower end of the point $b$ passing down through them, which forms a pivot for the parts to open and close upon. There are three of these sharp points, $b$ and $b'$ $b'$. The two latter are secured to the parts or sections A A′ by simply being headed in suitable holes made through the parts.

$d$ is the small screw by which the parts A A′ are held in closed position, which screw passes through the plain countersunk hole $a'$ and turns into the screw-threaded hole $a$, as shown clearly in Fig. 2.

To attach the device the screw $d$ will be removed, the parts or sections A A′ opened, and the ends $c$ $c$ placed in the calf's nose. The parts or sections A A′ will then be brought together and the screw $d$ put through the hole $a'$ and screwed tightly into the hole $a$, which will hold the ends $c c$ near enough together to securely attach the device to the nose of the calf.

Constructed in this manner the device is made very cheap, and it is at the same time efficient, reliable, and not liable to be lost out of the calf's nose.

I am aware that calf-weaners have been formed of two curved sections with pins in the same plane, one section having an arm pivoted to the other section and locked thereto by a spring slide-pin; but

What I claim as new and of my invention is—

A calf-weaner formed of two parts, A A′, carrying the points $b'$ $b$ $b'$, of which the point $b$ is extended to form a joint-pivot and locked together by a screw passing through the threaded hole $a$ of one part and the countersunk hole $a'$ of the other part, as shown and described.

WILLIAM F. GEISSLER.

Witnesses:
 FRED. PETTERSEN,
 OTTO FLACH.